United States Patent Office.

W. G. BUSEY, OF GEORGETOWN, DISTRICT OF COLUMBIA.

Letters Patent No. 76,991, dated April 21, 1868.

IMPROVED FERTILIZER.

*The Schedule referred to in these Letters Patent and making part of the same.*

TO ALL WHOM IT MAY CONCERN:

Be it known that I, W. G. BUSEY, of Georgetown, in the county of Washington, in the District of Columbia, have invented a new and improved Fertilizer; and I do hereby declare that the following is a full and exact description thereof.

The process of making my fertilizer (which shall be known as Busey's Excelsior Guano) is as follows:

Take of soluble superphosphate of lime, that has been made of bones carbonized in iron retorts or other close vessels, and then treated with one-fourth its weight of sulphuric acid, dried, and well pulverized, thirteen hundred pounds, (1,300 pounds;) of No. 1 Peruvian guano, sifted, and finely ground or otherwise pulverized, six hundred (600) pounds; and of muriate of soda, (common salt,) one hundred pounds, (100 pounds.) Mix the guano and salt well together first; then add the above-mentioned superphosphate of lime, and mix all intimately together, and the fertilizer is ready for use.

I do not propose to limit myself to the precise specific proportions of the several materials set forth, as the said proportions may, when desired, be changed to some extent.

What I claim as my invention is—

The fertilizer, formed by the combination and manner of combination of the several specific materials, substantially as herein set forth.

W. G. BUSEY.

Witnesses:
   S. C. BUSEY,
   G. S. DUNLOP.